United States Patent Office 3,255,184
Patented June 7, 1966

3,255,184
NOVEL 3,5-CYCLO-STEROIDS OF THE PREGNANE SERIES AND DERIVATIVES THEREOF
William J. Wechter, Kalamazoo, Mich., assignor to The Upjohn Company, Kalamazoo, Mich., a corporation of Delaware
No Drawing. Filed Nov. 20, 1961, Ser. No. 153,753
18 Claims. (Cl. 260—239.55)

This invention relates to certain novel and therapeutically useful steroids, novel intermediates, and processes for the production thereof and more particularly to (A) 6β,11-dihydroxy-3,5-cyclopregnan-20-ones, of the formula

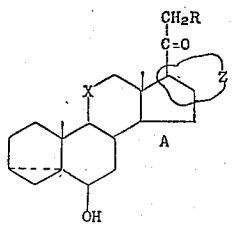

wherein R is selected from the group consisting of hydrogen and hydroxy, X is selected from the group consisting of the α-hydroxymethylene radical and the β-hydroxymethylene radical and Z is selected from the group consisting of

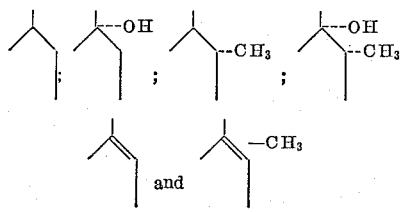

and

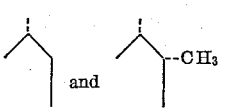

and (B) to certain 11-oxygenated pregnenolones of the formulae:

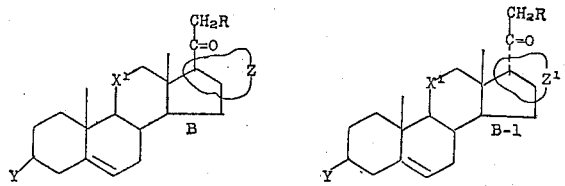

wherein R and Z have tthe meanings previously given, $X^1$ is selected from the group consisting of the carbonyl radical, the α-hydroxymethylene radical and the β-hydroxymethylene radical and Y is selected from the group consisting of β-chloro, β-bromo, β-iodo, β-hydroxy or β-OAc, in which Ac is the acyl radical of an organic carboxylic acid preferably a hydrocarbon carboxylic acid containing from 1 to 12 carbon atoms, inclusive, and $Z^1$ is selected from the group consisting of

[structure]
and
[structure]

The compounds of Formulae A and B are valuable sedative, tranquilizer, muscle-relaxant and analgetic central nervous system depressant agents, useful in the treatment of hypertension, nervous disorders and related illnesses in animals, including valuble domestic animals.

The compounds of Formula B–1 are useful as stimulants and psychic energizers.

The compounds of Formulae A, B, and B–1 are also useful intermediates for the preparation of other pharmacologically active steroids. e.g., 6α-fluoro-1-dehydrohydrocortisone, as hereinafter described.

The compounds of the present invention can be prepared and administered to the animal organism in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

The starting materials for this invention, represented by Formula I, below, are prepared following the procedures of U.S. Patent 2,816,901, as shown in Preparation 1, contained herein.

Group A.—The process of group A of this invention comprises subjecting an 11-desoxy-3,5-cyclosteroid to an aerobic mycelial fermentation process capable of introducing oxygen into the 3,5-cyclosteroid nucleus or to oxygenating enzymes obtainable therefrom and separating and isolating the resulting oxygenated 3,5-cyclosteroid.

The process for the production of the compounds of group A of this invention are illustratively represented by the following reaction scheme.

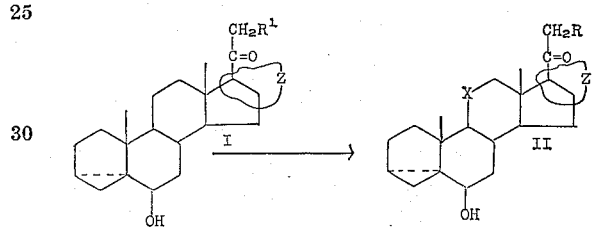

wherein R, X and Z have the same meanings as previously given and wherein $R^1$ is selected from the group consisting of hydrogen hydroxy and OAc in which Ac has the same meanings as previously given.

More particularly the process of Group A comprises subjecting all 11-desoxy-6β-hydroxy-3,5-cyclopregnan-20-one (I) to the oxidizing activity of a microorganism capable of introducing oxygen at the 11-position of a steroid, e.g., those microorganisms known in the art for converting progesterone to 11-hydroxyprogesterone, Compound S to hydrocortisone and the like, and isolating and separating the corresponding 6β,11-hydroxy-3,5-cyclopregnan-20-one (II), thus obtained.

Preferably, the microbiological oxygenation of the 11-desoxy-6β-hydroxy-3,5-cyclopregnan-20-ones of Formula I is carried out using an oxygenating species of fungus selected from the group consisting of fungi of the order Mucorales, the genus Aspergillus and the species *Curvularia lunata* or oxygenating enzymes obtainable therefrom. Among the families of the order Mucorales, genera of the family Mucoraceae, especially the genera Rhizopus, Mucor and Absidia are preferred for 11α-hydroxylation and genera of the family Cunninghamellaceae, especially the genera Cunninghamella, are preferred for 11β-hydroxylation of the compounds of Formula I. Species of these genera which are useful in this invention include, e.g., the Rhizopus species, *nigricans, arrhizus, delemar, microsporous, circians, japonicus, cohnii, oryzae, shanghaiensis,* and the like, the Mucor species, e.g., *mucedo, griseocyanus, parasillicus, adventitius, javanicus, microsporous, circinelloides* and the like, the Absidia species, *butleri, glauca, spinosa* and the like, the Gongronella species *butleri* and the Cunninghamella species, *blakesleeana, elegans, verticulata* and the like. Fungi of the genus Aspergillus are also useful in the 11α-hydroxylation of the compounds of Formula I, representative species of Aspergillus include, *niger, nidulans, ochraceus, flavus, wentii* and the like. Fungi of the species *Curvularia*

*lunata* are also useful for the 11β-hydroxylation of the compounds of Formula I. Species of the above listed fungi, which are especially useful for the 11-hydroxylation of the compounds of Formula I, are *Rhizopus nigricans* (e.g., ATCC 6227b), *Cunninghamella blakesleeana* (e.g., A.T.C.C. 8688A), *Aspergillus nidulans* (e.g. ATCC 11267) and *Curvularia lunata* (e.g. ATTC 12017). These species are available from the American Type Culture Collection, Washington, D.C.

In the process of Group A of this invention, the operational conditions and reaction procedure and details can be those already known in the art of steroid bioconversion as illustrated by Murray et al. U.S. Patent 2,602,769, 2,649,402 and 2,735,800.

The selected species of fungus is grown on a medium suitably containing assimilable non-steroidal carbon, illustratively carbohydrates, such as dextrose; assimilable nitrogen, illustratively soluble or insoluble proteins, peptones or amino acids; and mineral constituents, illustratively sodium or potassium phosphate and magnesium sulfate. The medium may desirably have a pH before inoculation of between about 3.7 to about 7.8 though a higher or lower pH may be used. A pH of between about 4.0 and about 7.0 is preferred for the growth of fungi and a temperature range from about twenty to about 35 degrees centigrade with about 25 to 30° C. preferred, depending upon the fungus used.

The growth period required before the 3,5-cyclosteroid substrate (I) is exposed to the microorganism is important in this case because acid conditions will cause rearrangement of the A-ring of the 3,5-cyclosteroid giving proportionally lower yields of the desired 11-hydroxy compound (II). Thus, the hydrogen-ion concentration conditions of this conversion are critical. The pH of the fermentation medium can be allowed to naturally rise to pH 7.0 or higher, preferably about 7.2 or the pH can be adjusted to the desired value, preferably about 7.2 before adding the selected 3,5-cyclosteroid. The pH should then be maintained within the range of 7.0 to about 9.0 during bioconversion. A pH range of from about 7.2 to about 8.0 is preferred. For optimum results, the pH should not be allowed to go below 7.0 at any time during the bioconversion.

The addition of the selected 3,5-cyclosteroid substrate to be fermented can be accomplished in any suitable manner, especially to promote a large surface contact of the substrate with the fungus, such as, for example, by dispersing the steroid substrate, either along with a dispersing agent, or in solution in an organic solvent.

The temperature during the period of fermentation of the steroid can be the same as that found suitable for the growth of the organism. It need be maintained only within such range as supports life, active growth, or the enzyme activity of the selected organism.

The time required for the fermentation of the steroid varies somewhat with the procedure. The steroid is usually added to the fermentation medium after 72 hours of growth, when the pH of the culture is above 7.0. The conversion of steroid substrate begins immediately and is substantially complete in from four hours to ten days, two days being generally satisfactory.

The 21-acyloxy group, when present in the selected starting material (I), is usually hydrolyzed during the fermentation process to give the corresponding 11-hydroxy-21-free alcohol (II).

After completion of the steroid fermentation, the resulting transformed steroid is recovered from the fermentation reaction mixture by extracting the fermentation reaction mixture, including the fermentation liquor and mycelium with an organic solvent for steroids, for example, methyl isopropyl ketone, methylene chloride, chloroform, carbon tetrachloride, ethylene chloride, trichloroethylene, ether, amyl acetate, benzene, and the like. The fermentation liquor and mycelium can be separated and then separately extracted with suitable solvents. The extracts can be combined, either before or after washing with an alkaline solution, illustratively sodium bicarbonate solution then suitably dried, as for example, over anhydrous sodium sulfate, and the resulting purified transformed steroid obtained by recrystallization from organic solvents, by trituration or by chromatography in order to isolate the thus obtained 11-oxygenated steroids from the other transformation products.

*Group B.*—The processes for the production of the compounds of Group B of this invention represented by Formulae B and B-1 above are illustratively represented by the following reaction scheme:

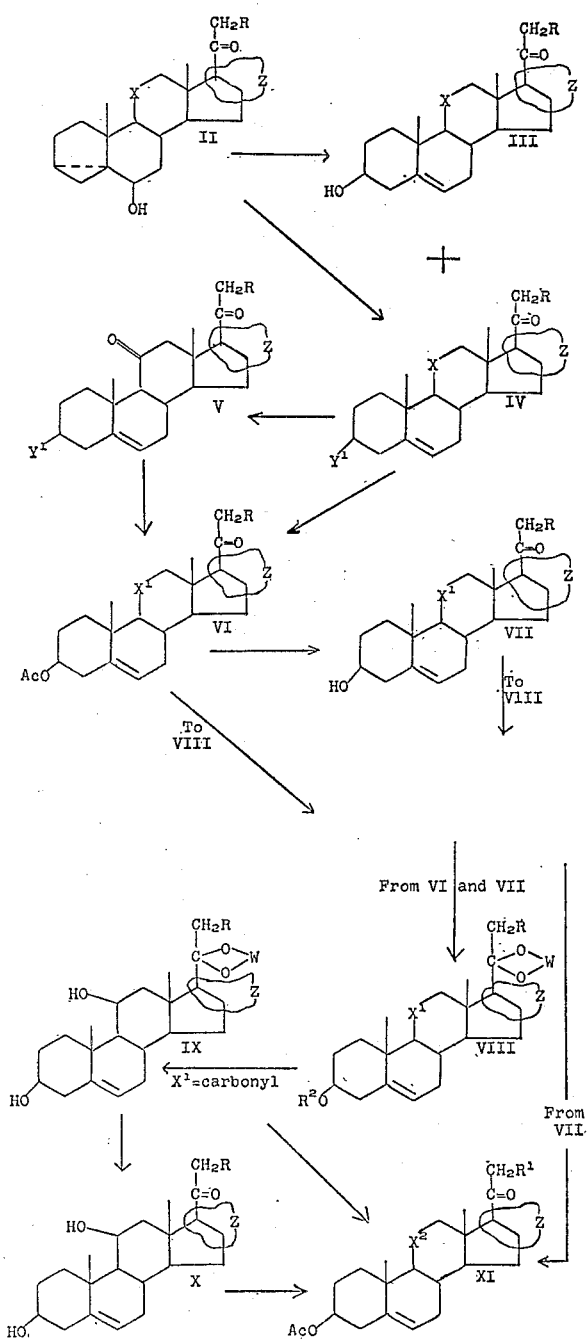

wherein R, $R^1$, $X^1$, Z and Ac have the meanings previously given, $X^2$ is the carbonyl radical or the β-hydroxymethylene radical, $Y^1$ is chlorine, bromine or iodine, $R^2$ is hydrogen or Ac in which Ac has the same meaning as previously given and W is an alkylene radical containing not more than 8 carbon atoms, inclusive, and the attaching oxygen to carbon bonds are separated by a chain of at least 2 and not more than 3 carbon atoms, e.g., ethylene, 1,2-propylene, 1,3-propylene, 2,2-dimethyltrimethylene, 1,2-butylene, 1,3-butylene, 2,3-butylene, 2,4-amylene, 4-methyl-1,2-amylene, 6-methyl-1,3-hexylene, 1,2-heptylene, 3,4-heptylene, 1,3-octylene, etc.

In the production of the compounds of Formulae III and IV, in which Z is

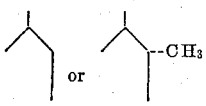

the corresponding compounds having the 17-iso side chain (17α) are concomitantly produced. These compounds are likewise converted to the 17-iso compounds (17α) corresponding otherwise to the compounds of Formulae V, VI and VII, in which Z is limited as above as shown in the following reaction scheme.

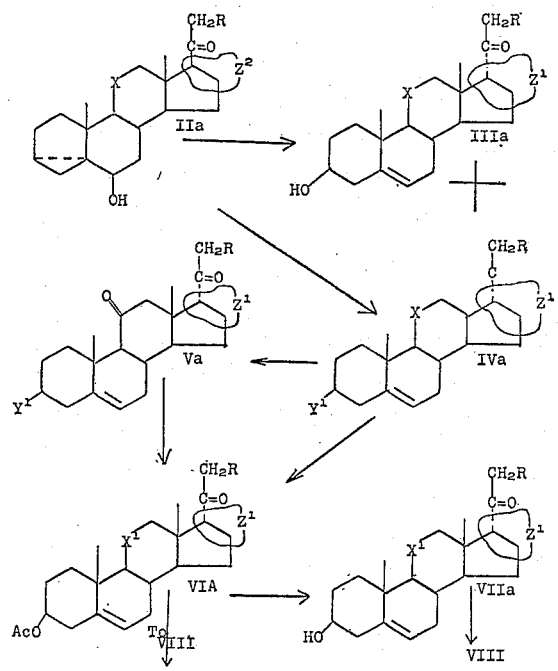

wherein R, X, X¹, Y¹, Z¹ and Ac have the meanings previously given and Z² is selected from the group consisting of

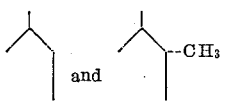

The 17-iso compounds (17α) of Formulae VIa and VIIa are converted during the ketalization step to the corresponding compounds of Formula VIII having the normal 17β-side chain.

The process of the present invention comprises: treating the selected 6β-11-dihydroxy-3,5-cyclopregnan-20-one (II) dissolved or suspended in a suitable solvent, e.g., acetic acid, acetone, benzene, toluene, ethanol, methanol, dioxane, methylene chloride, hexanes, water mixture thereof and the like, with a hydrogen halide (HCl, HBr, HI or HF) to produce the corresponding 3β-halo-11-hydroxy-5-pregnen-20-one (IV) and in the compounds in which Z is

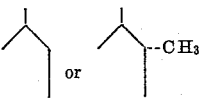

the corresponding 17α-isomer thereof, IVa, e.g., 3β-halo-11-hydroxy-17α-pregn-5-en-20-one which can be separated in accordance with methods known in the art, e.g., chromatography, recrystallization and the like. The reaction is preferably carried out using a concentrated hydrochloric acid and a water immiscible solvent under an atmosphere of nitrogen. When dilute aqueous acid is used, the corresponding 3β,11-dihydroxy-5-pregnen-20-one (III) and (IIIa) are likewise produced as by-products of the reaction. The 3-halo compounds thus produced are then oxidized in accordance with known methods for oxidizing 11-hydroxy groups, e.g., hydrocortisone to cortisone, e.g., chromic anhydride and acetic acid, chromium trioxide and sulfuric acid, N-haloimides or N-haloamides, etc., produce the corresponding 3β-halo-5-pregnene-11,20-dione (V), the corresponding 3β-halo-17α-pregn-5-ene-11,20-dione (Va) or mixture of the isomeric forms.

The compounds of Formulae IV and V, the 17-iso compounds (17α) of Formula IVa and Va or the mixtures of the corresponding 17α and 17β-isomers in which Z is

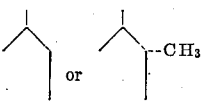

are then dissolved or suspended in a suitable solvent, e.g., acetone, acetic acid, benzene, toluene, hexanes, methylene chloride, etc. (when an organic acid is used as the solvent, the acyl group of the acid should correspond to the acyl group of the acid salt used for the desired acylation), and treated with a metal salt of an organic carboxylic acid, e.g., zinc acetate, mercuric propionate, zinc succinate, magnesium phenylacetate, zinc isobutyrate and the like to produce the corresponding 3-acylates, VI and VIa which can then be hydrolyzed in accordance with methods known in the art for converting 3-acetate groups to the free alcohol, e.g., pregnenolone acetate to pregnenolone, to produce the corresponding free 3-hydroxy compounds of Formula VII and VIIa.

The compounds of Formulae VI and VII, the 17-iso compounds (17α) of Formulae VIa and VIIa or mixtures of the corresponding 17α and 17β isomers are then ketalized at the 20-position with a lower alkylene α- or β-glycol, e.g., ethylene glycol in the presence of an acid catalyst, e.g., p-toluenesulfonic acid, sulfuric acid, etc. to produce the corresponding 11-oxygenated 5-pregnen-20-one-20-alkylene ketal, VIII, by methods known in the art, e.g., U.S. Patent 2,835,680. Reaction solvents which may be suitably employed include hydrocarbon solvents, halogenated hydrocarbons, ethers, and the like, e.g., benzene, xylene, hexane, chloroform, diethyl ether, tetrahydrofuran, dioxane, etc., or an excess of alkylene glycol can be used. When the starting material for the ketalization step is the 17α-isomer or a mixture containing both the 17α and 17β-isomers, the ketalization reaction rearranges the configuration of the 17α-side chain giving as the product of the reaction the corresponding 20-alkylene ketal, having the normal 17β-side chain.

The 11-keto compounds of Formula VIII, are dissolved in a suitable solvent and converted to the corresponding 11β-hydroxy compounds (IX) by reduction with a carbonyl reducing agent, e.g., lithium aluminum hydride, sodium borohydride and the like in accordance with methods well known in the art. Isolation from the reaction mixture and purification of the product by conventional means, yields the compounds represented by Formula IX. Removal of the 20-alkylene ketal group is readily effected by treatment of the compounds of Formula IX with a mineral acid such as sulfuric acid in the conventional manner of hydrolyzing ketals to yield the 20-keto compounds of Formula X.

The compounds of Formula X and the corresponding 11-keto and 11β-hydroxy compounds of Formula VII are reesterified to the corresponding 3-acylates and 3,21-diacylates by reaction with the selected acylating agent. This reaction can be performed under the esterification conditions known in the art, e.g., the esterification of pregnenolone to 3-acyloxypregnenolone. The selected compound is reacted with an acid chloride or acid bromide or the anhydride of an organic carboxylic acid, or by reaction with the selected acid in the presence of an esterification catalyst, for example, p-toluenesulfonyl chloride, trifluoroacetic anhydride, p-toluenesulfonic acid, trifluoroacetic acid, sulfuric acid, and the like, or with an ester under ester exchange reaction conditions. Compounds thus produced include those wherein Ac is the acyl radical of a hydrocarbon carboxylic acid containing from 1 to 12 carbon atoms, inclusive, e.g., the acids listed in Example 15.

The compounds of the present invention are useful in the production of other *highly* active *cortical* steroids such as 1-dehydro-6α-fluorohydrocortisone, for example, 3β - hydroxy - 5-pregnene-11,20-dione, 3β-hydroxy-17α-pregn-5-ene-11,20-dione or mixtures thereof (VII) are reacted with a lower-alkyl diester of oxalic acid, e.g., diethyl oxylate and an alkali metal base, e.g., sodium methoxide to produce the alkali metal enolates of 3β-hydroxy-21-lower - alkyloxyoxalyl - 5 - pregnene - 11,20-dione, 3β - hydroxy - 21 - lower-alkoxyoxalyl-17α-pregn-5-ene-11,20-dione and mixtures thereof, respectively. Without isolation, these compounds are then converted with a halogen, i.e., bromine, chlorine or iodine in the presence of a base, e.g., potassium acetate, to the corresponding 3β - hydroxy - 21,21 - dihalo - 21 - lower-alkyloxyoxalyl - 5 - pregnen - 11,20 - dione, 3β-hydroxy-21,21 - dihalo - 21 - lower - alkyloxyoxalyl-17α-pregn-5-ene-11,20-dione and mixtures thereof, respectively. Also without isolation, these compounds are then converted with an alkali metal lower-alkoxide, e.g., a potassium or sodium lower-alkoxide and a lower-alkanol, e.g., wherein the alkyl group is methyl, ethyl, propyl, n-butyl, amyl, hexyl, heptyl, or octyl, to produce the corresponding 3β-hydroxy-11-keto-5,17(20)-pregnadien - 21 - oic acid lower-alkyl ester (U.S. Patent 2,752,366). This compound is then epoxidized with an epoxidizing agent according to procedures known in the art (U.S. Patent 2,841,600), e.g., with peracetic acid, perbenzoic acid, or other peroxy compound known to be useful in converting isolated double bonds to epoxides to produce the corresponding 3β - hydroxy - 5α,6α - epoxy - 11 - keto - 17(20)-pregnen-21-oic acid lower-alkyl ester. A by-product in the reaction is the corresponding 5β,6β-epoxide which is preferably removed from the reaction mixture by fractional crystallization or chromatography. The 5α,6α-epoxy compound is then reacted with aqueous hydrofluoric acid, e.g., at 0° to 30° C., or with anhydrous hydrofluoric acid, preferably in the presence of a tetrahydrofuran, e.g., at —60° C. to 20° C., to produce the corresponding 3β,5α - dihydroxy-6β-fluoro-11-keto-17(20)-pregnen-21-oic acid lower-alkyl ester which is then oxidized with an oxidizing agent, e.g., with an N-haloamide or N-haloimide in pyridine, with chromic anhydride and dilute sulfuric acid in acetone or methylene chloride, with sodium dichromate in glacial acetic acid, or other known 3-hydroxy oxidizers to produce 3,11 - diketo - 5α - hydroxy - 6β - fluoro-17(20)-pregnen-21-oic acid lower-alkyl esters which are then converted to 6α-fluoro-1-dehydrohydrocortisone in the accordance with the process disclosed in U.S. Patent 2,841,600.

The following preparation and examples are illustrated of the products and processes of this invention.

PREPARATION 1

6β-hydroxy-3,5-cyclopregnan-20-one (I)

Pregnenolone (7.8 g.) dissolved in pyridine (100 ml.) was left at room temperature overnight with p-toluenesulphonyl chloride (7.8 g.). Water was added and the precipitate collected, washed with water and dried. Crystallization from acetone gave pregnenolone p-toluenesulphonate ester, M.P. 147° C.

Pregnenolone p-toluenesulphonate ester (5 g.) was heated with potassium acetate (5.5 g.) in acetone (70 ml.) and water (70 ml.) under reflux for 8 to 18 hours. The reaction mixture was then poured into water and the product extracted with ether containing a little chloroform. The extract was dried and the solvent distilled. The crude product was recrystallized from acetone, yielding 6 - hydroxy - 3:5-cyclopregnan-20-one, needles, M.P. 181° C., $[\alpha]_D^{24}+123°$ (c., 0.663 in chloroform).

In the same manner following the above procedure, but substituting as starting material in place of pregnenolone, Δ$^{16}$-pregnenolone,
16α-methylpregnenolone,
Δ$^{16}$-16-methylpregnenolone,
17α-hydroxypregnenolone,
16α-methyl-17α-hydroxypregnenolone,
21-hydroxypregnenolone 21-acetate,
17,21-dihydroxypregnenolone 21-acetate,
Δ$^{16}$-21-hydroxypregnenolone 21-acetate,
16α-methyl-21hydroxypregnenolone 21-acetate,
16α-methyl-17α,21-dihydroxypregnenolone 21-acetate, or
Δ$^{16}$-16α-methyl-21-hydroxypregnenolone 21-acetate, Preparation 1 is productive of 6β-hydroxy-3,5-cyclo-16-pregnen-20-one,
6β-hydroxy-16α-methyl-3,5-cyclo-pregnan-20-one,
6β-hydroxy-3,5-cyclo-16-methyl-16-pregnen-20-one,
6β,17α-dihydroxy-3,5-cyclopregnan-20-one,
6β,17α-dihydroxy-16α-methyl-3,5-cyclopregnan-20-one,
6β,21-dihydroxy-3,5-cyclopregnan-20-one 21-acetate,
6β,17α,21-trihydroxy-3,5-cyclopregnan-20-one 21-acetate,
6β,21-dihydroxy-3,5-cyclopregn-16-en-20-one 21-acetate,
6β,21-dihydroxy-16α-methyl-3,5-cyclopregnan-20-one 21-acetate,
6β,17α,21-trihydroxy-16α-methyl-3,5-cyclopregnan-20-one 21 acetate and
6β,21-dihydroxy-16-methyl-3,5-cyclopregn-16-en-20-one 21-acetate, respectively.

EXAMPLE 1

6β,11α-dihydroxy-3,5-cyclopregnan-20-one (II)

A medium was prepared of 2.5 kg. of cornsteep liquor (60% solids) and 1.25 kg. of commercial dextrose, diluted to 125 l. and adjusted to a pH of about 5.5; 25.0 ml. of lard oil was added as an antifoam preventive. This sterilized medium was inoculated with a 72-hour vegetative growth of *Rhizopus nigricans* (ATCC 6227b) and incubated for 72 hours at a temperature of about 28° C. using a rate of aeration of 5 l. per minute at 300 r.p.m. After 72 hours of agitation, at which time the pH of the beer was 7.2, a solution of 20 g. of 6β-hydroxy-3,5-cyclopregnan-20-one (I) in 300 ml. of N,N-dimethylformamide was added to the inoculated medium. (100 ml. of acetone was used to wash the substrate into the tank.) After an additional 24-hour period of incubation, the beer and mycelium were separated by filtration. The mycelium was washed with water and the washwater was added to the beer filtrate. The thus-obtained beer filtrate was extracted 4 times with a volume of methylene chloride:ethyl acetate (2:1 by volume) equal to one-fourth the volume of the filtrate. The combined extracts were washed with one-fourth volume of distilled water and the solvent was removed by distillation to give a crude residue. This residue was taken up in about 700 ml. of acetone and the solution treated with activated charcoal (Darco G-60) (7 g.) and filtered. The solution was then distilled to a volume of about 150 ml. whereupon the product crystallized giving 14.26 g. of 6β,11α-dihydroxy-3,5-cyclopregnan-20-one, M.P. 211.5–217°. The mother liquors from this crystallization afforded two additional crops which were combined and recrystallized to give 2.22 g. of 6β,11α-dihydroxy-3,5 - cyclopregnan - 20-one, M.P. 211.5–217° (total yield 82%). Three recrystallization from acetone afforded an analytical sample of 6β,11α - dihydroxy - 3,5 - cyclopregnan - 20 - one, M.P. 211.5–217°, moving as a single spot on a Bush system paper chromatogram. The infrared spectrum was consistent with the indicated structure: $\gamma_{max}$.3500, 3430, 1695, 1065, 1050 and 1025 cm.$^{-1}$.

*Analysis.*—Calcd. for $C_{21}H_{32}O_3$: C, 75.86; H, 9.70. Found: C, 76.02; H, 10.00.

EXAMPLE 2

*6β,11α-dihydroxy-3,5-cyclopregnan-20-one (II)*

A medium is prepared of 2.5 kg. of cornsteep liquor (60% solids) and 1 kg. of commercial dextrose, diluted to 125 l. and adjusted to a pH of about 5.5; 25 ml. of lard oil is added as an antifoam preventive. This sterilized medium is inoculated with a 72 hour vegetative growth of *Aspergillus nidulans* (ATCC 11267), and incubated for 72 hours at a temperature of about 28° C. using a rate of aeration of 5 l. per minute at 300 r.p.m. After 72 hours of agitation, at which time the pH of the beer is about 7.2, a solution of 20 g. of 6β-hydroxy-3,5-cyclopregnan-20-one (I) in 300 ml. of N,N-dimethylformamide is added to the inoculated medium. After an additional 24 hour period of incubation, the beer and mycelium are separated by filtration. The mycelium is washed with water and the washwater is added to the beer filtrate. The thus-obtained beer filtrate is extracted 4 times with a volume of methylene chloride:ethyl acetate (2:1 by volume) equal to one-fourth the volume of the filtrate. The combined extracts are washed with one-fourth volume of distilled water and the solvent removed by distillation to give a crude residue. This residue is taken up in about 700 ml. of acetone and the solution treated with activated charcoal (Darco G–60) (7 g.) and filtered. The solution is distilled until crystallization occurs, whereupon the product is further crystallized by cooling to give 6β,11α-dihydroxy-3,5-cyclopregnan-20-one, a light colored crystalline solid, identical to the product prepared in Example 1.

In the same manner substituting as the starting material in Example 1 or 2, other 3,5-cyclosteroids, prepared and listed in the last paragraph of Preparation 1, in place of 6β-hydroxy-3,5-cyclopregnan-20-one, is productive of 6β,11α-dihydroxy-3,5-cyclopregn-16-en-20-one,
6β,11α-dihydroxy-16α-methyl-3,5-cyclopregnan-20-one,
6β,11α-hydroxy-16-methyl-3,5-cyclopregn-16-en-20-one,
6β,11α,17α-trihydroxy-3,5-cyclopregnan-20-one,
6β,11α,17a-trihydroxy-16a-methyl-3,5-cyclopregnan-20-one,
6β,11α,21-trihydroxy-3,5-cyclopregnan-20-one,
6β,11α,17a,21-tetrahydroxy-3,5-cyclopregnan-20-one,
6β,11α,21-trihydroxy-3,5-cyclopregn-16-en-20-one,
6β,11α,21-trihydroxy-16a-methyl-3,5-cyclopregnan-20-one,
6β,11α,17α,21-tetrahydroxy-16α-methyl-3,5-cyclopregnan-20-one and
6β,11α,21-trihydroxy-16-methyl-3,5-cyclopregn-16-en-20-one, respectively.

EXAMPLE 3

*6β,11β-dihydroxy-3,5-cyclopregnan-20-one (II)*

A medium is prepared of 2.5 kg. of cornsteep liquor (60% solids) and 1 kg. of commercial dextrose, diluted to 125 l. and adjusted to a pH of about 5.5; 25 ml. of lard oil is added as an antifoam preventive. This sterilized medium is inoculated with a 72-hour vegetative growth of *Cunninghamella blackesleena* (ATCC 8688A), and incubated for 72 hours at a temperature of about 28° C. using a rate of aeration of 5 l. per minute at 300 r.p.m. After 72 hours of agitation, at which time the pH of the beer is about 7.2, a solution of 20 g. of 6β-hydroxy-3,5-cyclopregnan-20-one (I) in 300 ml. of N,N-dimethylformamide is added to the inoculated medium. After an additional 24-hour period of incubation, the beer and mycelium are separated by filtration. The mycelium is washed with water and the washwater is added to the beer filtrate. The thus-obtained beer filtrate is extracted 4 times with a volume of methylene chloride:ethyl acetate (2:1 by volume) equal to one-fourth the volume of the filtrate. The combined extracts are washed with one-fourth volume of distilled water and the solvent removed by distillation to give a crude residue. This residue is taken up in about 700 ml. of acetone and the solution treated with activated charcoal (Darco G–60) (7 g.) and filtered. The solution is distilled until crystallization occurs, whereupon the product is further crystallized by cooling to give 6β,11β-dihydroxy-3,5-cyclopregnan-20-one, a light colored crystalline solid identical to the same product prepared in Example 16, below.

EXAMPLE 4

*6β,11β-dihydroxy-3,5-cyclopregnan-20-one (II)*

A medium is prepared of 2.5 kg. of cornsteep liquor (60% solids) and 1 kg. of commercial dextrose, diluted to 125 l. and adjusted to a pH of about 5.5; 25 ml. of lard oil is added as an antifoam preventive. This sterilized medium is inoculated with a 72 hour vegetative growth of *Curvularia lunata* (ATCC 12017), and incubated for 72 hours at a temperature of about 28° C. using a rate of aeration of 5 l. per minute at 300 r.p.m. After 72 hours of agitation, at which time the pH of the beer is about 7.2, a solution of 20 g. of 6β-hydroxy-3,5-cyclopregnan-20-one (I) in 300 ml. of N,N-dimethylformamide is added to the inoculated medium. After an additional 24 hour period of incubation, the beer and mycelium are separated by filtration. The mycelium is washed with water and the washwater is added to the beer filtrate. The thus-obtained beer filtrate is extracted 4 times with a volume of methylene chloride:ethyl acetate (2:1 by volume) equal to one-fourth the volume of the filtrate. The combined extracts are washed with one-fourth volume of distilled water and the solvent removed by distillation to give a crude residue. This residue is taken up in about 700 ml. of acetone and the solution treated with activated charcoal and filtered. The solution is distilled until crystallization occurs, whereupon the product is further crystallized by cooling to give 6β,11β-dihydroxy-3,5-cyclopregnan-20-one, a light colored crystalline solid, identical to the same product prepared in Example 16, below.

In the same manner substituting as the starting material in Example 3 or 4, other 3,5-cyclo steroids prepared and listed in the last paragraph of Preparation 1, in place of 6β-hydroxy-3,5-cyclopregnan-20-one, is productive of 6β,11β-dihydroxy-3,5-cyclopregn-16-en-20-one,
6β,11β-dihydroxy-16α-methyl-3,5-cyclopregnan-20-one;
6β,11β-dihydroxy-16-methyl-3,5-cyclopregn-16-en-20-one,
6β,11β,17α-trihydroxy-3,5-cyclopregnan-20-one,
6β,11β,17α-trihydroxy-16α-methyl-3,5-cyclopregnan-20-one,
6β,11β,21-trihydroxy-3,5-cyclopregnan-20-one,
6β,11β,17α,21-tetrahydroxy-3,5-cyclopregnan-20-one,
6β,11β,21-trihydroxy-3,5-cyclopregn-16-en-20-one,
6β,11β,21-trihydroxy-16α-methyl-3,5-cyclopregnan-20-one,
6β,11β,17α,21-tetrahydroxy-16α-methyl-3,5-cyclopregnan-20-one, and
6β,11β,21-trihydroxy-16-methyl-3,5-cyclopregn-16-en-20-one, respectively.

EXAMPLE 5

*11α-hydroxypregnenolone (III), 3β-chloro-11α-hydroxy-5-pregnen-20-one (IV) and 3β-chloro-17α-pregn-5-ene-20-one (IVa)*

One gram of 6β,11α-dihydroxy-3.5-cyclopregnan-20-one (II) was dissolved in 100 ml. of acetone with warming and treated with 1 ml. of 3 N hydrochloric acid at reflux for ½ hour during which the volume of solution was reduced by distillation to about 75 ml. The solution was diluted with water to about 100 ml. giving an amorphous solid which after drying weighed 1.0 g. This material was recrystallized from acetone-Skellysolve B hexanes to give 2 crops of colorless needles.

*Crop 1.*—250 mg., M.P. 170°–173.0°. Recrystallization of this material for analysis from ethyl acetate-Skellysolve B hexanes gave colorless rosettes of 11α-hydroxypregnenolone, M.P. 179.0–181.0, $\gamma_{max.}$ 3420, 3340, 3020, 3000, 1618, 1063 and 1020 cm.$^{-1}$, moving as a single spot on a Bush B-1 system paperchromatogram.

*Analysis.*—Calcd. for $C_{21}H_{32}O_3$: C, 75.86; H, 9.70. Found: C, 75.83; H, 9.38.

*Crop 2.*—430 mg., M.P. 133.5–144.5°, Beilstein halogen test positive. This material was recrystallized four times from acetone-Skellysolve B hexanes for analysis, M.P. 140.0–144.5° C.; $\gamma_{max.}$ 3440, 3370, 3060, 3040, 1693, 1653, 1226, 1190, 1083, 1028, 808, 757 and 717 cm.$^{-1}$.

*Analysis.*—Calcd. for $C_{21}H_{31}O_2Cl$: C, 71.88; H, 8.91; Cl, 10.11. Found: C, 72.24; H, 9.23; Cl, 9.20.

The product of crop 2 was 3β-chloro-11α-hydroxy-5-pregnen-20-one containing a small amount of 3β-chloro-11α-hydroxy-17α-pregn-5-en-20-one, which can be separated by conventional methods, e.g., chromatography.

In the same manner, substituting 6β,11β-dihydroxy-3,5-cyclopregnan-20-one as starting material, Example 3 is productive of 11β-hydroxypregnenolone and a mixture of 3β-chloro-11β-hydroxy-5-pregnen-20-one and 3β-chloro-11β-hydroxy-17α-pregn-5-en 20-one.

In the same manner substituting as the starting material, the other compounds of Formula II, prepared and listed in Examples 2 and 4, above, Example 3 is productive of the corresponding 3β-hydroxy-5-pregnenes (III) and the corresponding 3β-chloro-5-pregnenes (IV and IVa).

EXAMPLE 6

*3β-chloro-11α-hydroxy-5-pregnen-20-one (IV) and 3β-chloro-11α-hydroxy-17α-pregn-5-en-20-one (IVa)*

A mixture of 10.0 g. of 6β,11α-dihydroxy-3,5-cyclopregnan-20-one (II), 200 ml. of benzene and 20 ml. of concentrated hydrochloric acid was stirred vigorously under a nitrogen atmosphere at room temperature for a period of about 2 hours. The acid layer was then separated from the benzene layer. The benzene solution thus obtained, was washed consecutively with two 200 ml. portions of water, 100 ml. of 4% aqueous sodium bicarbonate solution, and saturated sodium chloride solution. The washed benzene solution was dried over anhydrous sodium sulfate and then evaporated to dryness. The residue was dissolved in a minimum quantity of acetone and crystallized from acetone-Skellysolve B hexanes to give 8.45 g. of 3β-chloro-11α-hydroxy-5-pregnen-20-one containing about 15% 3β-cholro-11α-hydroxy-17α-pregne-5-en-20-one, M.P. 146–148° C.

A second crop of crystals was obtained by treating the crystallization mother liquors with activated charcoal and further reducing the volume by distillation to give 620 mg. of 3β-chloro-11α-hydroxy-5-pregnen-20-one containing 15% of the 17α-isomer M.P. 146–148° C. A second crystalline polymorph melting at 137.5–139.5° C., can be isolated from the above products.

In the same manner, substituting 6β-11β-dihydroxy-3,5-cyclopregnan-20-one as starting material in place of the 11α-isomer; Example 3, is productive of 3β-chloro-11β-hydroxy-5-pregnen-20-one and 3β-chloro-11β-hydroxy-17α-pregn-5-en-20-one, as light colored crystalline solids.

In the same manner, substituting as the starting material in Example 6 the other compounds of Formula II, prepared and listed in the second paragraph of Examples 2 and 4, above is productive of the other compounds of Formula IV and IVa, e.g., 3β-chloro-11α-hydroxy-5,16-pregnadien-20-one,
3β-chloro-11α-hydroxy-16α-methyl-5-pregnen-20-one and
3β-chloro-11α-hydroxy-16α-methyl-17α-pregn-5-en-20-one,
3β-chloro-11α-hydroxy-16α-methyl-5,16-pregnadien-20-one,
3β-chloro-11α,17α-dihydroxy-5-pregnen-20-one,
3β-chloro-11α,17α-dihydroxy-16α-methyl-5-pregnen-20-one,
3β-chloro-11α,21-dihydroxy-5-pregnen-20-one and
3β-chloro-11α,21-dihydroxy-17α-pregn-5-en-20-one,
3β-chloro-11α,17α,21-trihydroxy-5-pregnen-20-one,
3β-chloro-11α,21-dihydroxy-5,16-pregnadien-20-one,
β-chloro-11α,21-dihydroxy-16α-methyl-5-pregnen-20-one and
3β-chloro-11α,21-dihydroxy-16α-methyl-17α-pregn-5-en-20-one,
3β-chloro-11α,17α,21-trihydroxy-16α-methyl-5-pregnen-20-one,
3β-chloro-11α,21-dihydroxy-16-methyl-5,16-pregnadien-20-one, and the 11β-hydroxy compounds corresponding otherwise to the above-listed 11α-hydroxy compounds.

EXAMPLE 7

*3β-chloro-5-pregnene-11,20-dione (V) and 3β-chloro-17α-pregn-5-ene-11,20-dione (Va)*

A solution of 1.5 g. (3.27 moles) of 3β-chloro-11α-hydroxy-5-pregnen-20-one (IV) containing about 15% 3β-chloro-11α-hydroxy-17α-pregn-5-en-20-one (IVa) in 15 ml. of acetone was treated at room temperature with 1.1 ml. (3 moles) of 2.67 M Jones reagent (prepared from 26.7 g. of chromium trioxide and 23 ml. of sulfuric acid diluted to 100 ml. with water) and stirred vigorously for 10 minutes followed by dilution with water (ca. 100 ml.) giving a white solid. The product was filtered, washed and dried at room temperature to give 1.05 g. (91.5%) of a crystalline white solid, M.P. 135.0–137.5°. Recrystallization from acetone-Skellysolve B hexanes afforded an analytical sample of 3β-chloro-5-pregnene 11,20-dione M.P. 138.0–139.0° C., $\gamma_{max.}$ 1710 and 1630 cm.$^{-1}$.

*Analysis.*—Calcd. for $C_{21}H_{29}O_2Cl$: C, 72.28; H, 8.38; Cl, 10.17. Found: C, 72.26; H, 8.47; Cl, 10.21.

A 400 mg. sample of the above crude product was chromatographed on a column of 25 g. of Florisil (synthetic magnesium silicate). The column was then eluted using a gradient of from 5–8% acetone-Skellysolve B hexanes. The eluant was collected in fifteen 50 ml. fractions giving in fractions 2 and 3 50 mg. of 3β-chloro-17α-pregn-5-ene-11,20-dione. Crystallization from Skellysolve B (hexanes) gave colorless bars of 3β-chloro-17α-pregn-5-ene-11,20-dione, M.P. 126.0–127.0° C.; $\gamma_{max.}$ 1697 and 1662 cm.$^{-1}$. Nuclear magnetic resonance analysis indicated that this material possessed the 17-iso (17α) side chain. Recrystallization gave an analytical sample of 3β-chloro-17α-pregn-5-ene-11,20-dione having a melting point of 126.5–128° C. and the following analysis:

*Analysis.*—Calcd. for $C_{21}H_{29}O_2Cl$: C, 72.28; H, 8.38; C, 10.17. Found: C, 72.23; H, 8.51; Cl, 10.44.

In the same manner, substituting as the starting material the other 11α- or 11β-hydroxy compounds of Formula IV and IVa, prepared and listed in the 4th paragraph of Example 6, Example 7 is productive of the corresponding 11-keto compounds (V and Va), e.g., 3β-chloro-5,16-pregnadiene-11,20-dione,
3β-chloro-16α-methyl-5-pregnene-11,20-dione and
3β-chloro-16α-methyl-17α-pregn-5-ene-11,20-dione,
3β-chloro-16-methyl-5,16-pregnadiene-11,20-dione,
3β-chloro-17α-hydroxy-5-pregnene-11,20-dione,
3β-chloro-17α-hydroxy-16α-methyl-5-pregnene-11,20-dione, 3β-chloro-21-hydroxy-5-pregnene-11,20-dione and
3β-chloro-21-hydroxy-17α-pregna-5-ene-11,20-dione,
3β-chloro-17α,21-dihydroxy-5-pregnene-11,20-dione,
3β-chloro-21-hydroxy-5,16-pregnadiene-11,20-dione,
3β-chloro-21-hydroxy-16α-methyl-5-pregnene-11,20-dione and
3β-chloro-21-hydroxy-16α-methyl-17α-pregna-5-ene-11,20-dione,
3β-chloro-17α-21-dihydroxy-16α-methyl-5-pregnene-11,20-dione and
3β-chloro-21-hydroxy-16-methyl-5,16-pregnadiene-11,20-dione.

EXAMPLE 8

*3β-bromo-11α-hydroxy-5-pregnen-20-one (IV)*

A suspension of 1.34 g. of 6β,11α-dihydroxy-3,5-cyclopregnan-20-one (II) in 50 ml. of benzene was stirred with 5 ml. of 48% hydrobromic acid for about 18 hours. The reaction mixture was diluted with water, the benzene layer was separated and washed successively with water 4% sodium bicarbonate solution, water, saturated sodium chloride solution; dried over sodium sulfate, and taken to dryness in vacuo. The residue thus obtained was dissolved in methylene chloride and adsorbed onto a short Florisil (synthetic magnesium silicate) column and eluted with 5% acetone in Skellysolve B hexanes giving a white solid. Recrystallization from acetone-Skellysolve B hexanes gave 470 mg. of colorless plates of 3β-bromo-11α-hydroxy-5-pregnen-20-one M.P. 142.0–144.0°. An additional recrystallization from acetone-Skellysolve B hexanes gave 3β-bromo-11α-hydroxy-5-pregnen-20-one, M.P. 144.5–145.5°, $\gamma_{max.}$ 3400 and 1695 cm.$^{-1}$.

*Analysis.*—Calcd. for $C_{21}H_{33}O_2Br$: Br, 20.11. Found: Br, 20.40.

Substituting 5 ml. of concentrated aqueous HI for HBr is productive of the corresponding 3-iodo compound, 3β-iodo-11α-hydroxy-5-pregnen-20-one, a light colored crystalline solid.

In the same manner, substituting 6β,11β-dihydroxy-3,5-cyclopregnan-20-one as the starting material, Example 6 is productive of 3β-bromo-11β-hydroxy-5-pregnen-20-one or 3β-iodo-11β-hydroxy-5-pregnen-20-one.

In the same manner, substituting as the starting material the other 11α-hydroxy or 11β-hydroxy compounds of Formula II, prepared and listed in Examples 2 and 4, above, Example 8 is productive of the 3β-bromo or 3β-iodo-5-pregnenes of Formula IV and IVa corresponding otherwise to the 3β-chloro compounds prepared and listed in the 4th paragraph of Example 6.

EXAMPLE 9

*3β-bromo-5-pregnene-11,20-dione (V)*

A solution of 390 mg. (1 mole) of 3β-bromo-11α-hydroxy-5-pregnen-20-one (IV) in 2 ml. of acetone was treated with 0.38 ml. of 2.67 M Jones reagent (prepared in Example 7, above) with stirring for 10 minutes after which the reaction mixture was diluted with 20 ml. of water giving a white solid which was isolated, washed with water and dried. Recrystallization from acetone-Skellysolve B afforded 320 mg. of colorless prisms of 3β-bromo-5-pregnene-11,20-dione M.P. 148.0–149.0° C.

An analytical sample was prepared by further recrystallization from acetone-Skellysolve B to give 3β-bromo-5-pregnene-11,20-dione, M.P. 144.0–145.0°, $\gamma_{max.}$ 1710 and 1665 cm.$^{-1}$.

*Analysis.*—Calcd. for $C_{21}H_{31}O_2Br$: C, 63.78; H, 7.90; Br, 20.21. Found: C, 64.28; H, 7.55; Br, 20.04.

In the same manner substituting as the starting material 3β-iodo-11α-hydroxy-5-pregnen-20-one IV or the other 3β-bromo or 3β-iodo compound of Formulae IV or IVa, Example 9 is productive of 3β-iodo-5-pregnene-11,20-dione and the other corresponding 3β-bromo and 3β-iodo-11-keto compounds of Formulae V and Va, respectively.

EXAMPLE 10

*3β-hydroxy-5-pregnene-11,20-dione 3-acetate (VI) and 3β-hydroxy-17α-pregn-5-ene-11,20-dione 3-acetate (VIa)*

A mixture of 6.54 g. of 3β-chloro-5-pregnene-11,20-dione V and 3β-chloro-17α-pregn-5-ene-11,20-dione (Va) containing about 15% of the 17α-isomer (prepared according to the procedure of Example 7, above) and 13 g. of zinc acetate was suspended in 100 ml. of glacial acetic acid and heated to reflux for 5 hours. Acetic acid (55 ml.) was then removed by distillation followed by dilution with 350 ml. of water to give a crystalline solid which was recrystallized from ethanol-water to give 4.8 g. of a mixture of 3β-hydroxy-5-pregnene-11,20-dione 3-acetate and 3β-hydroxy-17α-pregn-5-ene-11,20-dione 3-acetate, M.P. 128–133° C. A sample for analysis was recrystallized three times from ethanol and melted at 133.5–167°, $\gamma_{max.}$ 1725, 1700, 1667, 1248 cm.$^{-1}$; gas-liquid chromatography on a fire brick column using 2% silicone rubber at 257° C. as the liquid phase gave peaks at 10.1 minutes and 12.1 minutes showed that the product contained about 85% 3β-hydroxy-5-pregnene-11,20-dione 3-acetate and about 15% 3β-hydroxy-17α-pregn-5-ene-11,20-dione 3-acetate. The 17α- and 17β-isomers can be separated by recrystallization or chromatography or both.

*Analysis.*—Calcd. for $C_{23}H_{32}O_4$: C, 74.16; H, 8.66. Found: C, 74.02; H, 8.55.

In the same manner, substituting as starting material, 3β-chloro-5-pregnene-11,20-dione or 3β-chloro-17α-pregn-5-ene-11,20-dione in place of the mixture thereof, is productive of 3β-hydroxy-5-pregnene-11,20-dione 3-acetate and 3β-hydroxy-17α-pregn-5-ene 3-acetate, respectively.

In the same manner, substituting 3β-chloro-11α-hydroxy-5-pregnene-20-one, 3β-chloro-11α-hydroxy-17α-pregn-5-en-20-one, or mixtures thereof, or the corresponding 11β-hydroxy compounds or mixtures thereof, Example 10 is productive of the corresponding 3-acetates, i.e., 3β,11α-dihydroxy-5-pregnen-20-one 3-actate, 3β,11α-dihidroxy 17α-pregn-5-en-20-one 3-acetate, mixtures thereof, 3β,11β-dihydroxy-5-pregnen-20-one 3-acetate, 3β,11βdihydroxy-17α-pregn-5-en-20-one 3-acetate and mixtures thereof, respectively.

In the same manner, the corresponding 3β-bromo or 3β-iodo compounds can be substituted as starting material in place of the 3-chloro starting materials.

Other 3-acylates, wherein the acyl radical is that of an organic carboxylic acid, can be prepared by substituting other metal acylates in place of zinc acetate, e.g., magnesium propionate, mercuric butyrate, zinc isovalerate, mercuric benzoate, and the like.

EXAMPLE 11

*3β-hydroxy-5-pregnene-11,20-dione (VII) and 3β-hydroxy-17α-pregn-5-ene-11,20-dione (VIIa)*

The crystalline product from Example 10, above (200 mg.), i.e., a mixture of 3β-hydroxy-5-pregnene-11,20-dione 3-acetate (85%) and 3β-hydroxy-17α-pregn-5-ene-11,20-dione 3-acetate (15%) (VI) was suspended in 5 ml. of 5% potassium hydroxide in methanol and warmed on the steam bath 1 hour followed by dilution with 2.5 ml. of 3 N hydrochloric acid. Water was then added until turbidity occurred, giving on cooling a white solid product which was isolated, washed and dried in a vacuum oven at 60° C. to give 200 mg. of a mixture consisting of about 85% 3β-hydroxy-5-pregnene-11,20-dione and about 15% 3β-hydroxy-17α-pregn-5-ene-11,20-dione. The product thus obtained was adsorbed onto 10 g. of Florisil, synthetic magnesium silicate, and eluted with 20 ml. fractions over a gradient of from 5–15% acetone-Skellysolve B hexanes. Fractions 8–12 were combined and recrystallized from acetone-Skellysolve B hexanes to give 31 mg. of colorless bars of 3β-hydroxy - 17α-pregn-5-ene-11,20-dione, M.P. 166.2–167.0° C.; tetranitromethane test positive; gas liquid chromatography on fire brick at 255° C. with 2% silicone rubber as the liquid phase gave a single peak at 7.5 minutes; nuclear magnetic resonance indicated the 17-iso side chain; infrared analysis was consistent with the sturcture.

*Analysis.*—Calcd. for $C_{21}H_{30}O_3$: C, 76.32; H, 9.15. Found: C, 76.32; H, 9.36.

Fractions 15–20 were combined and crystallized from acetone-Skellysolve B hexanes to give 61 mg. of 3β-hydroxy-5-pregnene-11,20-dione, M.P. 169.8–171.9; tetranitromethane test positive; gas-liquid chromatography on fire brick using 2% silicone rubber as the liquid phase gave a single peak at 8.9 minutes; nuclear magnetic resonance indicated the 17β-side chain. Recrystallization from acetone-Skellysolve B hexanes gave an analytical sample of 3β-hydroxy-5-pregnene-11,20-dione, M.P. 172.0–174.0°, $\gamma_{max.}$ 3460, 3400, 1705 and 1670 cm.$^{-1}$.

*Analysis.*—Calcd. for $C_{21}H_{30}O_3$: C, 76.32; H, 9.15. Found: C, 76.46; H, 9.29.

In the same manner, substituting as starting material 3β-hydroxy-5-pregnene-11,20-dione 3-acetate or 3β-hydroxy-17α-pregn-5-ene-3,20-dione 3-acetate in place of the mixture thereof, is productive of the corresponding free 3-hydroxy compound.

In the same manner, the corresponding 11α-acetoxy and 11β-hydroxy 3-acylates can be converted to corresponding free 3-hydroxy compounds.

EXAMPLE 12

*3β-hydroxy-5-pregene-11,20-dione 20-ethylene ketal (VIII)*

One gram of 3β-hydroxy-5-pregnene-11,20-dione (VII), 25 ml. of benzene, 5 ml. of ethylene glycol and 5 mg. of p-toluenesulfonic acid were heated at reflux for approximately 17 hours. Water was removed during the reflux period by use of a Dean-Stark water trap. The hot solution was then washed with 4% aqueous sodium bicarbonate solution, water, saturated aqueous sodium chloride solution, and dried over sodium sulfate. The solvent was then removed under reduced pressure to give 3β-hydroxy-5-pregnene-11,20-dione 20-ethylene ketal, a crystalline solid. Recrystallization from acetone gave 660 mg. of 3β-hydroxy-5-pregnene-11,20-dione 20-ethylene ketal, M.P. 150.5–154.0° C., a second crop of product melting at 148.0–152.5° C. was recovered from the mother liquor. A sample of the first crop of product was recrystallized 3 times from acetone giving an analytical sample, M.P. 155–157° C.; $\gamma_{max.}$ 3230, 1708 and 1670 cm.$^{-1}$.

*Analysis.*—Calcd. for $C_{23}H_{34}O_4$: C, 73.76; H, 9.15. Found: C, 74.05; H, 8.90.

EXAMPLE 13

*3β-hydroxy-5-pregnene-11,20-dione 20-ethylene ketal (VIII) from 3β-hydroxy-17α-pregn-5-ene-11,20 dione*

A sample of 136 mg. of 3β-hydroxy-17α-pregn-5-ene-11,20-dione (VII) in 15 ml. in benzene was treated in the same manner as described in Example 12, to give 66 mg. of 3β-hydroxy-5-pregnene-11,20-dione 20-ethylene ketal, M.P. 153–156° C.; a second crop gave an additional 15 mg., M.P. 147.0–151.5° C. The infrared absorption spectrum of the first crop was identical with that of 3β-hydroxy-5-pregnene-11,20-dione 20-ethylene ketal produced in Example 12.

EXAMPLE 14

*3β,11β-dihydroxy-5-pregnen-20-one 20-ethylene ketal (IX)*

A suspension of 600 mg. of 3β-hydroxy-5-pregnene-11,20-dione 20-ethylene ketal (VIII) in 25 ml. of isopropyl alcohol was reacted with sodium borohydride (2.5 mg.) in 0.1 N aqueous sodium hydroxide solution at reflux for about 18 hours. The resulting solution was diluted with 50 ml. of water and the crystalline product thus obtained was filtered, washed with water and dried to give 3β,11β-dihydroxy-5-pregnen-20-one 20-ethylene ketal, M.P. 213.5–218.5° C. Two recrystallizations from acetone-Skellysolve B hexanes gave an alalytical sample of the above product, M.P. 210–215° C.; $\gamma_{max}$ 3540, 3460, 1670 cm.$^{-1}$.

*Analysis.*—Calcd. for $C_{23}H_{36}O_4$: C, 73.36; H, 9.64. Found: C, 73.27; H, 9.50.

EXAMPLE 15

*3β,11β-dihydroxy-5-pregnen-20-one (X)*

A solution of 400 mg. of 3β,11β-dihydroxy-5-pregnen-20-one 20-ethylene ketal (IX) in 40 ml. of warm acetone was treated with 5 ml. of 3 N hydrochloric acid overnight at room temperature. The solution was then diluted with 150 ml. of warm water giving a white crystalline solid. The product was collected on a filter, washed with aqueous acetone, water and dried to give 3β,11β-dihydroxy-5-pregnen-20-one, M.P. 187.0–189.5° C. Recrystallization gave an analytical sample melting at 187.0–189.5° C.; $\gamma_{max.}$ 3430, 1690, 1198, 1165 and 1065 cm.$^{-1}$.

*Analysis.*—Calcd. for $C_{21}H_{32}O_3$: C, 75.86; H, 9.70. Found: C, 76.21; H, 9.90.

EXAMPLE 16

*6β,11β-dihydroxy-3,5-cyclopregnan-20-one (II)*

A solution of 250 mg. 3β,11β-dihydroxy-5-pregnen-20-one (X) in 7 ml. of pyridine was treated with 250 mg. of p-toluenesulfonyl chloride overnight at room temperature, then poured into 45 ml. of water containing 2 ml. of concentrated hydrochloric acid and allowed to stand for 4 hours. The crystalline product thus obtained was filtered, washed with water and dried in vacuo at 60° C. to give 280 mg. of the 3-tosylate of 6β,11β-dihydroxy-5-pregnen-20-one, M.P. 142.0–143.0° C. The tosylate was then dissolved in 50 ml. of acetone and treated with 500 mg. of potassium acetate dissolved in 25 ml. of water at reflux overnight. The majority of the acetone was distilled precipitating 190 mg. of crude 6β,11β-dihydroxy-3,5-cyclopregnan-20-one, M.P. 187–225°. This material was adsorbed onto Florisil synthetic magnesium silicate (25 g.) and eluted over a gradient of from 2 to 20% acetone-Skellysolve B hexanes collecting 29 fractions. Fractions 15–22 were combined and recrystallized from acetone for analysis affording 37 mg. of 6β,11β-dihydroxy-3,5-cyclopregnan-20-one, M.P. 239–243° C., $\gamma_{max.}$ 3500, 3440 and 1695 cm.$^{-1}$.

*Analysis.*—Calcd. for $C_{21}H_{32}O$: C, 75.86; H, 9.70. Found: C, 75.68; H, 9.71.

EXAMPLE 17

*3β,11β-dihydroxy-5-pregnen-20-one 3-acetate (XI)*

One gram of 3β,11β-dihydroxy-5-pregnen-20-one 20-ethylene ketal was dissolved in 1 ml. of acetic anhydride and 6 ml. of pyridine and stirred at room temperature (about 25° C.) for 24 hours. The reaction mixture was then poured into 10 ml. of water and made slightly acid by the addition of 6 N-sulfuric acid. The precipitate thus obtained was collected on a filter, washed with water and dried to give 1.1 g. of 3β,11β-dihydroxy-5-pregnen-20-one 3-acetate, a white crystalline solid, M.P. 175.5–177.5° C., which was further purified by recrystallization from acetone to give an analytical sample, M.P. 179.0–180.0° C. Infrared analysis was consistent with the structure.

*Analysis.*—Calcd. for $C_{23}H_{34}O_4$: C, 73.76; H, 9.15. Found: C, 73.91; H, 9.61.

In the same manner, substituting as the starting material in Example 17, other compounds of Formula IX or X, e.g., 3β-hydroxy-5-pregnene-11,20-dione 20-ethylene ketal, is productive of the corresponding 3-acetate of Formula XI, e.g., 3β-hydroxy-5-pregnene-11,20-dione 3-acetate.

When the 21-free alcohol group is present in the compounds of Formula IX or X, acetylation occurs concommitantly at both the 3- and 21-positions, thereby producing the corresponding 3,21-diacetates of Formula XI.

The compounds of Formulae IX and X are converted to other 3-esters and 3,21-diesters by esterification, e.g., by reaction with the appropriate acid anhydride, acid chloride or bromide, ester by ester exchange, acid in the presence of an esterification catalyst, etc., to produce the corresponding 21-acylates which include those wherein the acyl radical of the 21-acylate group is the acyl radical of, for example, an aliphatic acid, e.g., acetic, propionic, butyric, valeric, hexanoic, lauric, trimethylacetic, isobutyric, isovaleric, tertiary butylacetic, a cycloaliphatic acid, e.g., β-cyclopentylpropionic, cyclohexanecarboxylic, cyclohexylacetic, an alkaryl acid, e.g., benzoic, phenylacetic, β-phenylpropionic, o-, m-, and p-toluic, a saturated dibasic acid (which can be converted into water soluble, e.g., sodium, salts), e.g., succinic, adipic, a monobasic unsaturated acid, e.g., acrylic, crotonic, undecylenic, propiolic, 2-butynoic, undecolic, cinnamic, dibasic unsaturated acids (which can be converted into water soluble, e.g., sodium, salts), e.g., maleic and citraconic, other organic substituted acids, e.g., lactic, mandelic, salicylic, trifluoroacetic, chloroacetic, α- and β-bromopionic, iodobenzoic, thioglycolic, α-aminopropionic, benzenesulfonic, toluenesulfonic, 2-furoic and the like.

EXAMPLE 18

*3β-hydroxy-11-keto-5,17(20)-pregnadien-21-oic acid methyl ester*

To a stirred solution of 16.5 g. of 3β-hydroxy-5-pregnene-11,20-dione in tertiary butyl alcohol at 60° C. in a nitrogen atmosphere is added 28 ml. of ethyl oxalate followed by 26 g. of a 25.7% w./w. solution of sodium methoxide in methanol. The mixture is allowed to cool to 25–30° C. and stirred for two hours. To the solution containing the sodium enolate of 11-keto-21-ethoxyoxalylpregnenolone is added a cold solution of 7.2 ml. of acetic acid and 8.3 g. of sodium acetate in 350 ml. of methanol and the mixture is cooled to 0° C. With continued cooling, there is then added over a period of about 10 minutes an ice cold solution of 24 g. of bromine in 240 ml. of methanol. To the resulting solution, there is rapidly added 58.5 g. of 25.7% w./w. sodium methoxide in methanol. Cooling is discontinued and stirring is continued for about 1.5 hours. To the solution containing 3β-hydroxy - 5,6 - dibromo-11-keto-17(20)-pregnen-21-oic acid methyl ester, there is then added 80 ml. of acetic acid and 15 g. of zinc dust and stirring is continued for about 30 minutes. The mixture is filtered and the filtrate evaporated to a thick paste which is shaken with methylene chloride and water. The methylene chloride phase is separated, evaporated to dryness and then redissolved in a small amount of methylene chloride. The solution is chromatographed on 600 g. of magnesium silicate (Florisil). The column is eluted with increasing portions of acetone in hexanes (Skellysolve B). Fractions containing the desired product are combined, freed of solvent and the residue recrystallized from hexanes to give 3β-hydroxy - 11 - keto-5,17(20)-pregnadien-21-oic acid methyl ester as a mixture of cis and trans isomers in two crops, which can be separated by methods known in the art, e.g., fractional crystallization.

Following the above procedure but substituting a 3β-hydroxy-5-pregnene-11,20-dione 3-acylate, there is obtained the corresponding 3β - hydroxy - 5,17(20) - [cis]-pregnadien-21-oic acid methyl ester.

Following the above procedure, but substituting another sodium lower-alkoxide in an alkanol for the sodium methoxide in methanol employed therein, there is produced other lower-alkyl esters of 3β-hydroxy-11-keto-17(20)-pregnen-21-oic acid wherein the ester group is ethyl, propyl, butyl, octyl, etc.

EXAMPLE 19

*3β-hydroxy-5α,6α-epoxy-11-keto-17(20)[cis]-pregnen-21-oic acid methyl ester*

To a solution of 5.0 g. of 3β-hydroxy-11-keto-17(20) [cis]-pregnadien-21-oic acid methyl ester in chloroform cooled to 0° C. is added 1.0 g. of sodium acetate followed with vigorous stirring by 10 ml. of 40% peracetic acid. The mixture is stirred for about 5 hours at 0° to 5° C. and then mixed with a solution of 2.5 g. of sodium sulfite in 75 ml. of water. The cooling is then discontinued and stirring is continued for 30 minutes. The organic layer is separated, washed with aqueous sodium bicarbonate solution, dried and evaporated at reduced pressure. The crystalline residue thus obtained, is recrystallized from a mixture of acetone and hexanes to give g. of 3β-hydroxy - 5α,6α - epoxy-11-keto-17(20)[cis]-pregnen-21-oic acid methyl ester, a light colored crystalline solid.

Similarly, other 3β-hydroxy-5α,6α-epoxy-11-keto-17(20)[cis]pregnen-21-oic acid lower-alkyl esters, e.g., methyl, propyl, butyl, octyl, etc., are prepared by substituting the corresponding esters of 3β-hydroxy-11-keto-5,17(20)[cis]-pregnadien-21-oic acid as the starting steroid.

EXAMPLE 20

*3β,5α-dihydroxy-6β-fluoro-11-keto-17(20)[cis]-pregnen-21-oic acid methyl ester*

To a solution of 7.5 g. of anhydrous hydrogen fluoride in 15 ml. of tetrahydrofuran cooled in a Dry Ice-methanol bath is added a solution of 3.64 g. of 3β-hydroxy-5α,6α-epoxy-11-keto-17(20)[cis]-pregnen-21-oic acid methyl ester in methylene chloride chilled to −10° C. After swirling, the mixture is stored at −10° C. for 2 hours and then at 5° C. for 2.5 hours. The mixture is then cautiously added to 500 ml. of ice water containing 30 g. of sodium bicarbonate. The neutralized organic layer is separated, using additional methylene chloride, dried and evaporated. The residue, thus obtained, is redissolved in methylene chloride and chromatographed on magnesium silicate. The column is eluted with acetone-hexanes to give 3β,5α-dihydroxy-6β-fluoro-11-keto-17(20) [cis]-pregnen-21-oic acid methyl ester, a light colored crystalline solid.

Similarly, other 3β,5α-dihydroxy-6β-fluoro-11-keto-17(20)[cis]-pregnen-21-oic acid lower-alkyl esters are prepared by substituting the corresponding lower-alkyl esters, e.g., ethyl, propyl, butyl, octyl, etc., of 3β-hydroxy-5α-6α-epoxy-11-keto-17(20)[cis]-pregnen-21-oic acid, respectively, as the starting steroid.

EXAMPLE 21

*3,11-diketo-5α-hydroxy-6β-fluoro-17(20)[cis]-pregnen-21-oic acid methyl ester*

A solution of 2.8 g. of 3β,5α-dihydroxy-6β-fluoro-11-keto-17(20)[cis]-pregnen-21-oic acid methyl ester in acetic acid is cooled to 15° C. and to the stirred solution is added a similarly cooled solution of 2.8 g. of sodium dichromate dihydrate in 50 ml. of acetic acid. The cooling bath is removed and the mixture is stirred for 1.5 hours. Dilution with water gives an amorphous solid which is collected on a filter, washed with water and dried to give 3,11-diketo-5α-hydroxy-6β-fluoro-17(20) [cis]-pregnen-21-oic acid methyl ester, a light colored crystalline solid, which can be converted to 6α-fluoro-1-dehydrocortisone in accordance with the process disclosed in U.S. Patent 2,841,600.

I claim:

1. A compound of the formula:

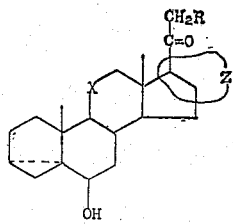

wherein R is selected from the group consisting of hydrogen and hydroxy, X is selected from the group consisting of the α-hydroxymethylene radical and the β-hydroxymethylene radical and Z is selected from the group consisting of

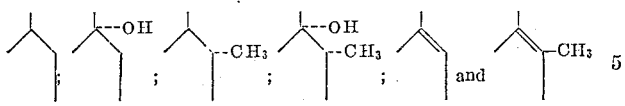

2. 6β,11α-dihydroxy-3,5-cyclopregnan-20-one.
3. 6β,11β-dihydroxy-3,5-cyclopregnan-20-one.
4. A compound of the formula:

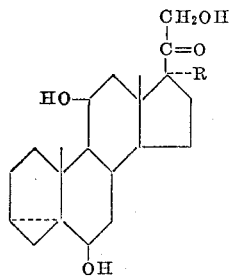

wherein R is selected from the group consisting of hydrogen and hydroxy.

5. 6β,11β,21-trihydroxy-3,5-cyclopregnan-20-one.
6. 6β,11β,17α,21-tetrahydroxy - 3,5 - cyclopregnan-20-one.
7. 3β-hydroxy-5-pregnene-11,20-dione 3-acetate.
8. 3β,11β-dihydroxy-5-pregnen-20-one 3-acetate.
9. A compound selected from the formulae:

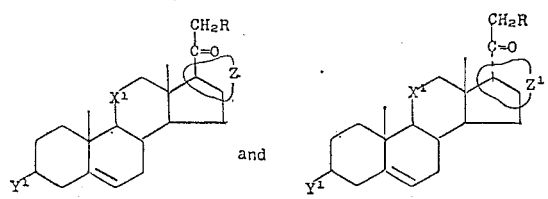

wherein R is selected from the group consisting of hydrogen and hydroxy and $X^1$ is selected from the group consisting of the α-hydroxymethylene radical, the β-hydroxymethylene radical and the carbonyl radical, $Y^1$ is selected from the group consisting of chlorine, bromine and iodine, Z is selected from the group consisting of

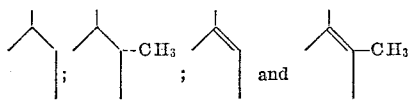

and $Z^1$ is selected from the group consisting of

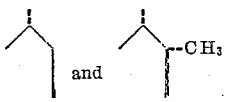

10. 3β-chloro-11α-hydroxy-5-pregnen-20-one.
11. 3β-bromo-11α-hydroxy-5-pregnen-20-one.
12. 3β-chloro-5-pregnene-11,20-dione.
13. 3β-bromo-5-pregnene-11,20-dione.
14. A compound selected from the formulae:

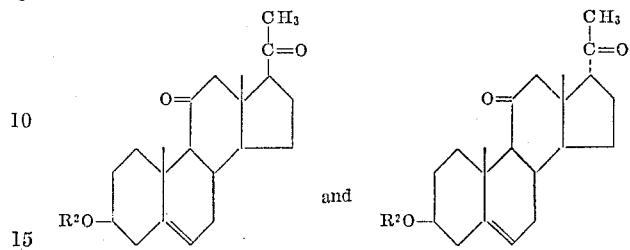

wherein $R^2$ is selected from the group consisting of hydrogen and an acyl radical of a hydrocarbon carboxylic acid containing from 1 to 12 carbon atoms, inclusive.

15. 3β-hydroxy-5-pregnene-11,20-dione.
16. A compound selected from the formulae

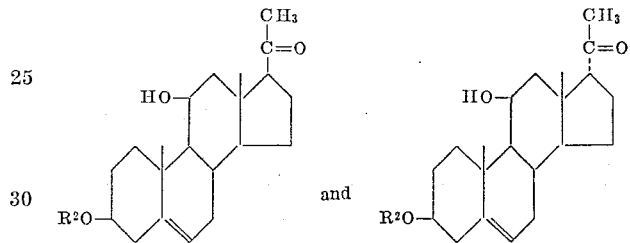

wherein $R^2$ is selected from the group consisting of hydrogen and an acyl radical of a hydrocarbon carboxylic acid containing from 1 to 12 carbon atoms, inclusive.

17. 3β,11β-dihydroxy-5-pregnen-20-one.
18. A compound selected from the group consisting of 3β - hydroxy-11-keto-5,17(20)[cis]-pregnadien-21-oic acid methyl ester, 3β-hydroxy-5α,6α-epoxy-11-keto-17-(20)[cis]-pregnen-21-oic acid methyl ester, and 3β,5α-dihydroxy - 6β - fluoro-11-keto-17(20)[cis]-pregnen-21-oic acid methyl ester.

References Cited by the Examiner
UNITED STATES PATENTS

| | | | |
|---|---|---|---|
| 2,602,769 | 7/1952 | Murray et al. | 195—51 |
| 2,649,402 | 8/1953 | Murray et al. | 195—51 |
| 2,735,800 | 2/1956 | Murray et al. | 195—51 |

OTHER REFERENCES

Djerassi, Steroid Reactions, pages 160 and 177 (1963), Holden-Day, Inc., San Francisco, Calif.

LEWIS GOTTS, *Primary Examiner.*

MORRIS LIEBMAN, *Examiner.*

HENRY A. FRENCH, *Assistant Examiner.*